United States Patent
Park et al.

(10) Patent No.: US 9,764,626 B2
(45) Date of Patent: Sep. 19, 2017

(54) ONE-MOTOR ELECTRIC SUNSHADE AND SUNROOF STRUCTURE

(71) Applicants: Hyundai Motor Company, Seoul (KR); Kia Motors Corporation, Seoul (KR); Webasto Donghee Holdings Co., Ltd., Ulsan (KR)

(72) Inventors: Jeong-Hoon Park, Suwon-si (KR); Seong-Min Kwak, Busan (KR)

(73) Assignees: Hyundai Motor Company, Seoul (KR); Kia Motors Corporation, Seoul (KR); Webasto Donghee Holdings Co., Ltd., Ulsan (KR)

( * ) Notice: Subject to any disclaimer, the term of this patent is extended or adjusted under 35 U.S.C. 154(b) by 0 days.

(21) Appl. No.: 15/099,313

(22) Filed: Apr. 14, 2016

(65) Prior Publication Data

US 2016/0339769 A1 Nov. 24, 2016

(30) Foreign Application Priority Data

May 18, 2015 (KR) .......................... 10-2015-0068581

(51) Int. Cl.
*B60J 3/00* (2006.01)
*B60J 7/057* (2006.01)
*B60J 7/00* (2006.01)
*B60J 7/043* (2006.01)

(52) U.S. Cl.
CPC .............. *B60J 7/003* (2013.01); *B60J 7/043* (2013.01)

(58) Field of Classification Search
CPC .......... B60J 7/003; B60J 7/0015; B60J 7/043

USPC .................................... 296/214, 216.01–224
See application file for complete search history.

(56) References Cited

U.S. PATENT DOCUMENTS

| | | | | | |
|---|---|---|---|---|---|
| 5,147,107 | A | * | 9/1992 | Yamauchi | ................ B60J 7/057 296/214 |
| 5,558,394 | A | * | 9/1996 | Mori | ........................ B60J 7/003 296/214 |
| 6,491,340 | B2 | * | 12/2002 | Hori | ....................... B60J 7/0573 296/214 |

(Continued)

FOREIGN PATENT DOCUMENTS

| | | | | |
|---|---|---|---|---|
| FR | 2842466 A1 | * | 1/2004 | ............ B60J 7/0015 |
| FR | 2842764 A1 | * | 1/2004 | ............ B60J 7/0015 |

(Continued)

*Primary Examiner* — Dennis H Pedder
(74) *Attorney, Agent, or Firm* — Morgan, Lewis & Bockius LLP

(57) ABSTRACT

A one-motor electric sunshade and sunroof structure may include glass sleds configured to open and close a sunroof glass by sliding in a front and rear direction along mechanism rails disposed at both sides of a roof panel for a vehicle, each having both ends to which a front sled and a rear sled are rotatably coupled, respectively, main cable devices which are connected with a drive motor by a cable, and movable along the mechanism rails, each having a cable protrusion that protrudes to be slidably accommodated in glass grooves formed in side surfaces of the front sled, the rear sled, and the glass sled, and sunshade sleds selectively coupled to the main cable devices and configured to open and close the sunshade by sliding, each having a first side at which a sunshade lever, which is selectively restricted with a corresponding mechanism rail, is mounted.

7 Claims, 13 Drawing Sheets

(56) References Cited

U.S. PATENT DOCUMENTS

| | | | | |
|---|---|---|---|---|
| 7,798,567 B2* | 9/2010 | Glasl | ................... | B60J 7/0015 |
| | | | | 160/265 |
| 7,891,730 B2* | 2/2011 | Rikkert | ................. | B60J 7/0573 |
| | | | | 296/220.01 |
| 8,052,207 B2* | 11/2011 | Horiuchi | ................ | B60J 7/0038 |
| | | | | 296/214 |
| 8,439,433 B2* | 5/2013 | Kim | ................... | B60J 7/0573 |
| | | | | 296/214 |
| 8,690,235 B2* | 4/2014 | Lee | ................... | E05F 15/643 |
| | | | | 296/214 |
| 9,056,540 B2* | 6/2015 | Walter | ................. | B60J 7/0573 |
| 2006/0284450 A1* | 12/2006 | Regnier | ................. | B60J 7/024 |
| | | | | 296/216.01 |
| 2015/0038291 A1 | 2/2015 | Kenichi | | |

FOREIGN PATENT DOCUMENTS

| | | |
|---|---|---|
| JP | 2001-39162 A | 2/2001 |
| JP | 2011-5960 A | 1/2011 |
| JP | 2014-119093 A | 6/2014 |
| KR | 10-1233765 B1 | 2/2013 |
| KR | 10-1233770 B1 | 2/2013 |

\* cited by examiner

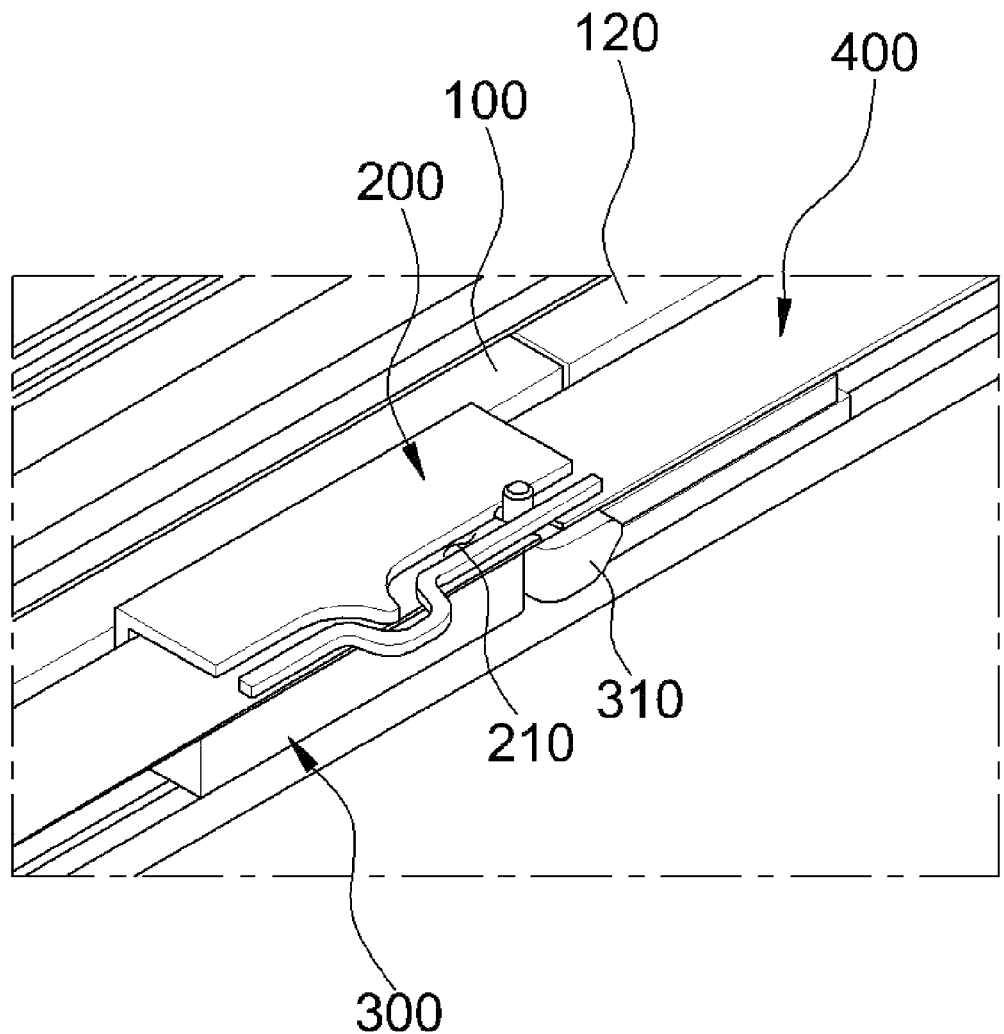

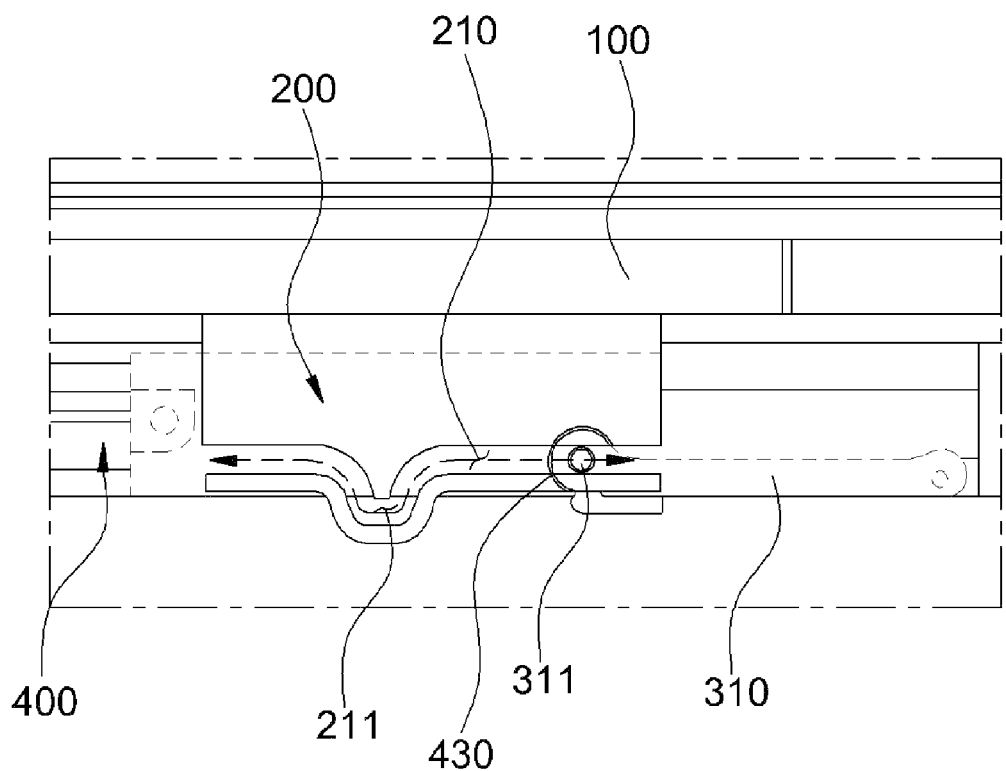

ONE-MOTOR ELECTRIC SUNSHADE AND SUNROOF STRUCTURE

CROSS-REFERENCE TO RELATED APPLICATIONS

The present application claims priority to Korean Patent Application No. 10-2015-0068581, filed May 18, 2015, the entire contents of which is incorporated herein for all purposes by this reference.

BACKGROUND OF THE INVENTION

Field of the Invention

The present invention relates to an electric sunshade and sunroof structure for a vehicle, and more particularly, to a one-motor electric sunshade and sunroof structure in which a sunshade and a sunroof glass may be opened or closed in a unified manner by using a one drive motor, thereby remarkably reducing production costs and a weight of a vehicle body, and greatly improving use convenience for a consumer.

Description of Related Art

An opening may be formed in a roof panel (ceiling portion) of a vehicle in order to discharge air in the vehicle to the outside or allow outside air to flow into the vehicle, and a sunroof glass is typically installed to be open-able and closeable in the opening.

That is, various types of frames including mechanism rails are installed on the roof panel, and the sunroof glass is vertically tilted up and down on the frame, or slides in a front and rear direction.

Recently, a panoramic sunroof, in which most of the roof panel is manufactured as the sunroof glass and a part of the roof panel is selectively opened and closed, is widely used for the purpose of providing clear openness and an excellent aesthetic appearance, and a driver may have a larger amount of sunlight through the panoramic sunroof.

Meanwhile, the sunroof glass is typically made of a transparent material, so that a direct beam is transmitted into the vehicle as it is, and thus, a sunshade is installed at a lower side of the sunroof glass so as to be slidable in the front and rear direction.

The sunshade is utilized for various purposes such as preventing a temperature in the vehicle from being increased in the summer, preventing the vehicle from being covered with frost in the winter, and preventing light blindness of a driver, and has a structure that may be opened and closed by a user as necessary at any time.

However, there is a problem in that the sunroof glass and the sunshade in the related art slide in the front and rear direction by two different drive motors, respectively, which causes increases in production costs for a vehicle and a weight of a vehicle body, and causes a head lining to have an excessive depth, so that headroom in the rear of the vehicle becomes poor.

In some cases, a method has been used of operating only the sunroof glass, between the sunroof glass and the sunshade in the related art, by using one drive motor, and sliding the sunshade manually, but this method also has a problem in that convenience of use for a consumer deteriorates.

Therefore, a need for a sunroof structure in which both of the sunroof glass and the sunshade are electrically operated by one drive motor has gradually increased in the art in order to reduce production costs and improve convenience for a user.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a one-motor electric sunshade and sunroof structure in which both a sunroof glass and a sunshade may be operated by one drive motor, thereby remarkably reducing production costs for a vehicle and a weight of a vehicle body.

Various aspects of the present invention are additionally directed to providing a one-motor electric sunshade and sunroof structure in which both a sunroof glass and a sunshade are operable by electric power, thereby remarkably increasing convenience for a user and improving marketability of a vehicle.

According to various aspects of the present invention, a one-motor electric sunshade and sunroof structure may include glass sleds configured to open and close a sunroof glass by sliding in a front and rear direction along mechanism rails disposed at both sides of a roof panel for a vehicle, each having both ends to which a front sled and a rear sled are rotatably coupled, respectively, main cable devices which are connected with a drive motor by a cable, and movable along the mechanism rails, each having a cable protrusion that protrudes to be slidably accommodated in glass grooves formed in side surfaces of the front sled, the rear sled, and the glass sled, and sunshade sleds selectively coupled to the main cable devices and configured to open and close the sunshade by sliding, each having a first side at which a sunshade lever, which is selectively restricted with a corresponding mechanism rail, is mounted, in which the sunroof glass and the sunshade for the vehicle are opened and closed by a same drive motor.

The one-motor electric sunshade and sunroof structure may further include a tilt lever is disposed at a lower side of the sunroof glass to be rotatable in a vertical direction, and includes a tilt groove recessed in a side surface of the tilt lever, and a tilt protrusion portion protruding from and coupled to a first side of the glass sled, and slidably accommodated in the tilt groove, in which when the glass sled moves forward, the tilt lever moves upward by the sliding motion of the tilt protrusion portion and tilts up the sunroof glass.

The front sled may be hingedly coupled to a front end of the glass sled by a first hinge, the rear sled may be hingedly coupled to a rear end of the glass sled by a second hinge, and an end of each of the front sled and the rear sled may be formed with a downward bend.

In each mechanism rail, a front restricting groove may be formed recessed to correspond to a position where the end of the front sled is seated, and a rear restricting groove may be formed recessed to correspond to a position where the end of the rear sled is seated.

A cable groove, in which a sunshade protrusion which protrudes at an upper side of the sunshade lever is slidably accommodated, may be formed recessed at a lower side of the main cable device, and the sunshade protrusion may be configured to release the restriction between the mechanism rail and the sunshade lever by sliding along the cable groove by the movement of the main cable device.

A catching portion, which is recessed in a 'U' shape and allows the main cable device and the sunshade sled to move simultaneously with rotation of the sunshade lever, may be formed in the cable groove.

The catching portion may be formed at a central portion of the cable groove, and remaining portions of the cable groove other than the catching portion may be formed in a straight shape.

According to the present invention having the aforementioned configurations, all of the operations of tilting up and down the sunroof glass, opening and closing the sunroof glass, and opening and closing the sunshade may be carried out by utilizing one drive motor, and as a result, production costs for a vehicle and a weight of a vehicle body are remarkably reduced.

According to the present invention, one drive motor may be substituted for two drive motors that were used to electrically operate the sunroof glass and the sunshade in the related art, thereby remarkably reducing a thickness of a rear headroom.

According to the present invention, both of the sunroof glass and the sunshade may be opened and closed by a user's simple button manipulation, thereby remarkably improving convenience for a user, and improving marketability of a vehicle.

According to the present invention, the sunroof glass and the sunshade may be opened and closed by comparatively simple structures such as the glass sled, the main cable device, and the sunshade sled in a state in which unnecessary configurations in the related art are omitted, and as a result, the present invention is advantageous in terms of a package layout of a vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5A and FIG. 5B respectively illustrate a perspective view and a top plan view of a state in which a mechanism rail and a sunshade lever according to the present invention are restricted.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
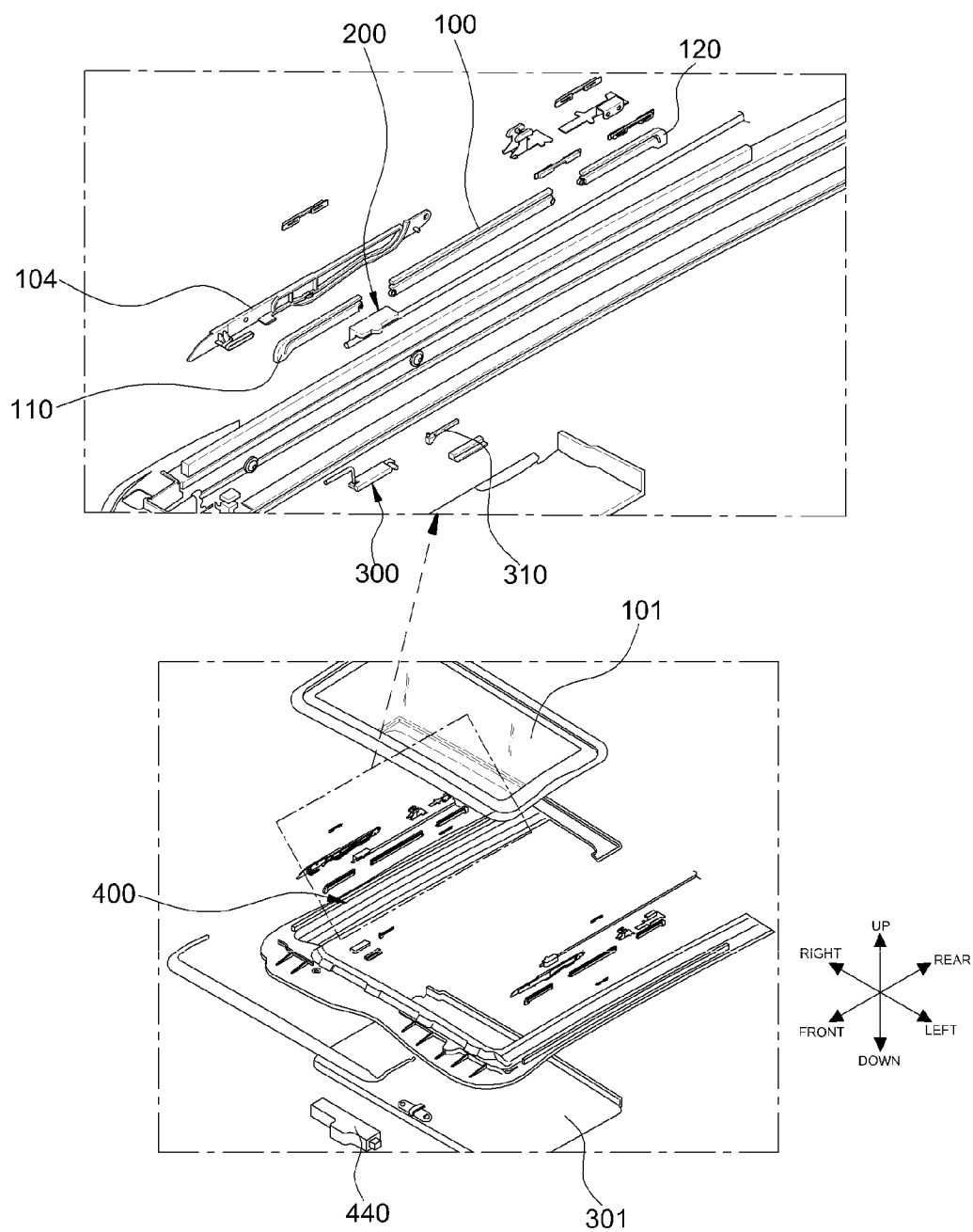
FIG. 1 illustrates an exploded perspective view and an enlarged view illustrating a state in which respective components of a one-motor electric sunshade and sunroof structure according to the present invention are disassembled.
Figure 2:
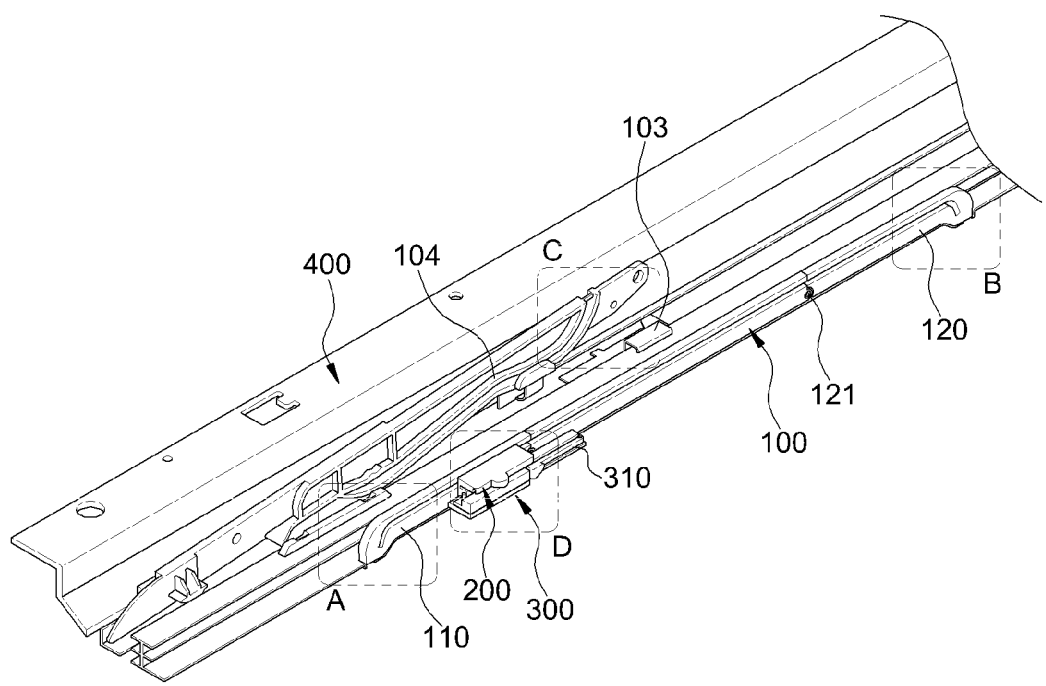
FIG. 2 is a perspective view illustrating an appearance of the one-motor electric sunshade and sunroof structure according to the present invention.
Figure 3A:
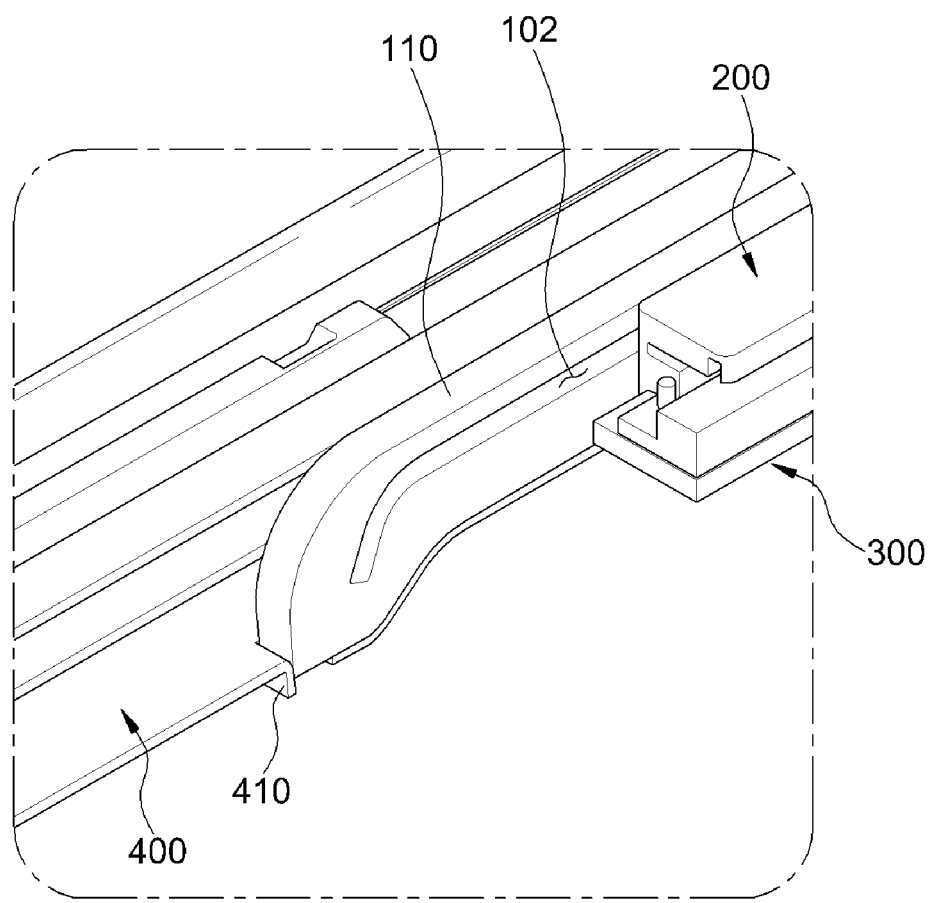
FIG. 3A is an enlarged view of part A in FIG. 2.
Figure 3B:
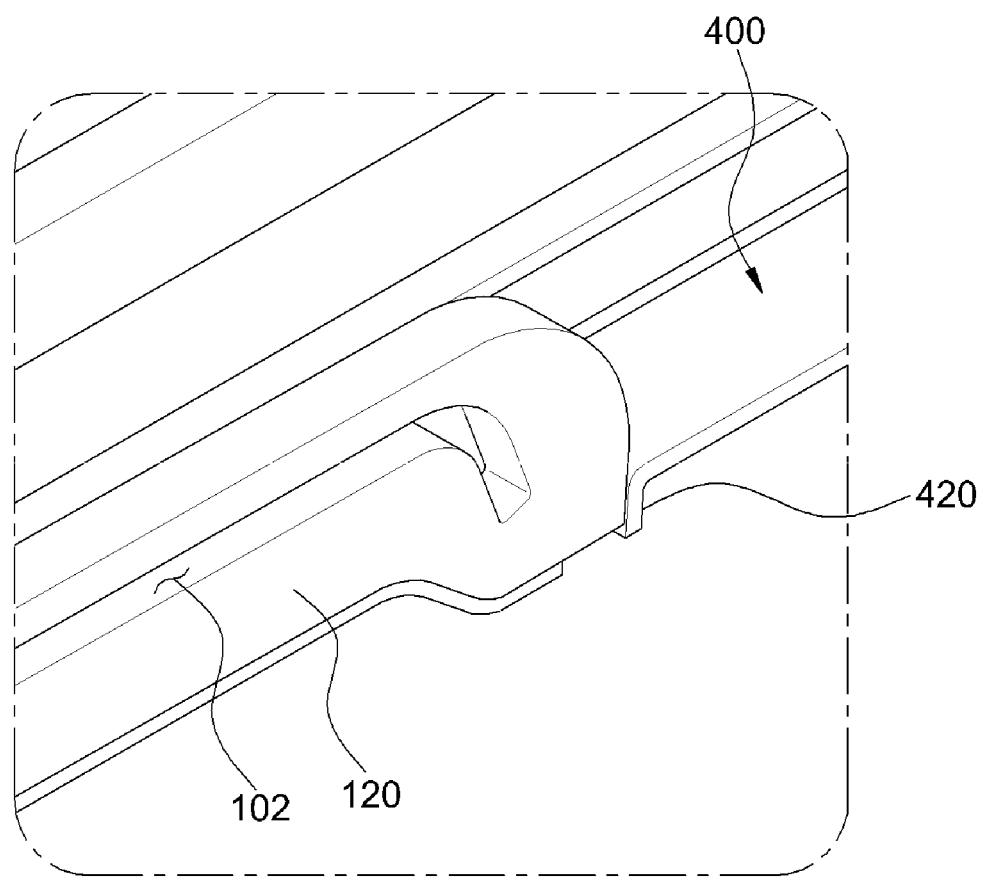
FIG. 3B is an enlarged view of part B in FIG. 2.
Figure 3C:
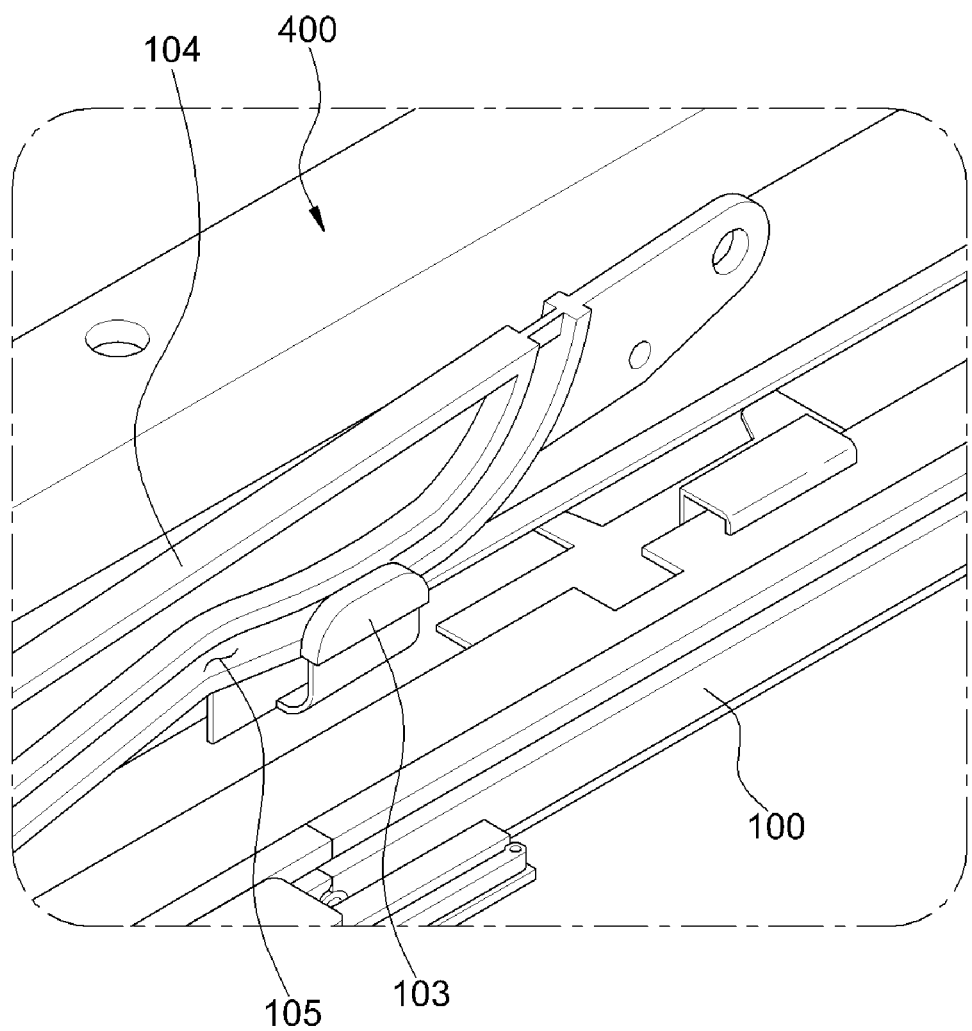
FIG. 3C is an enlarged view of part C in FIG. 2.
Figure 3D:
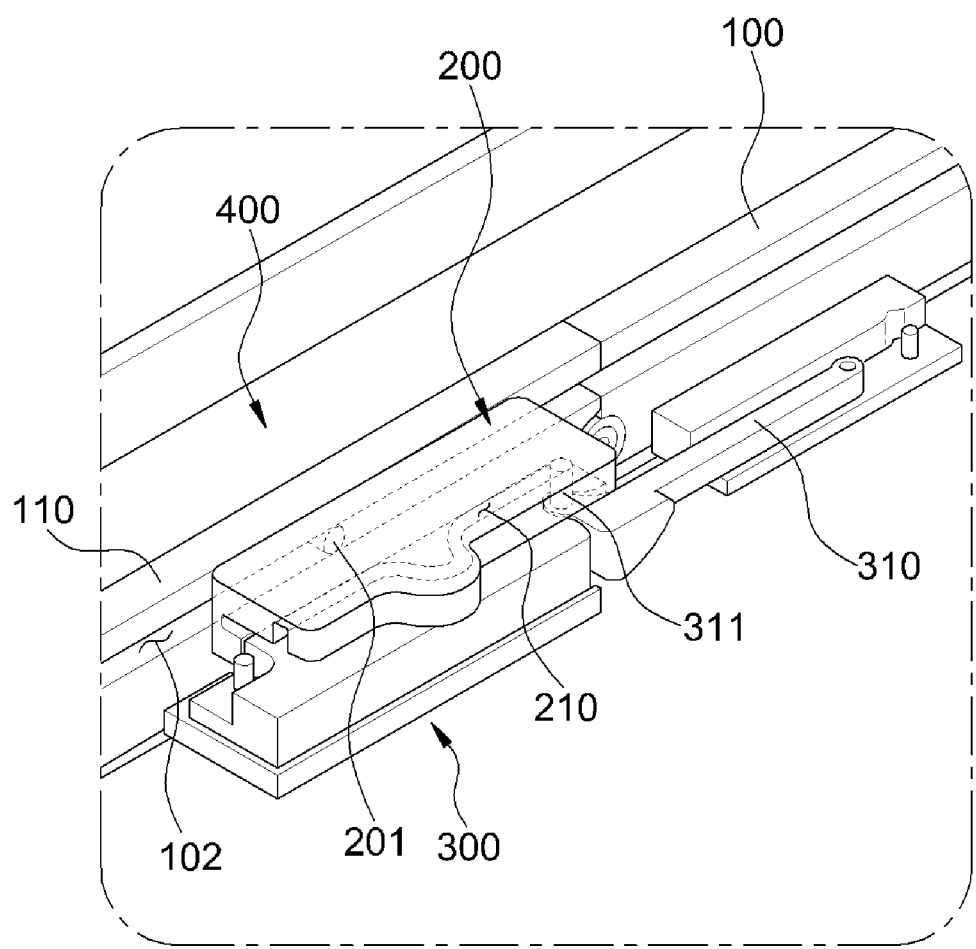
FIG. 3D is an enlarged view of part D in FIG. 2.
Figure 4:
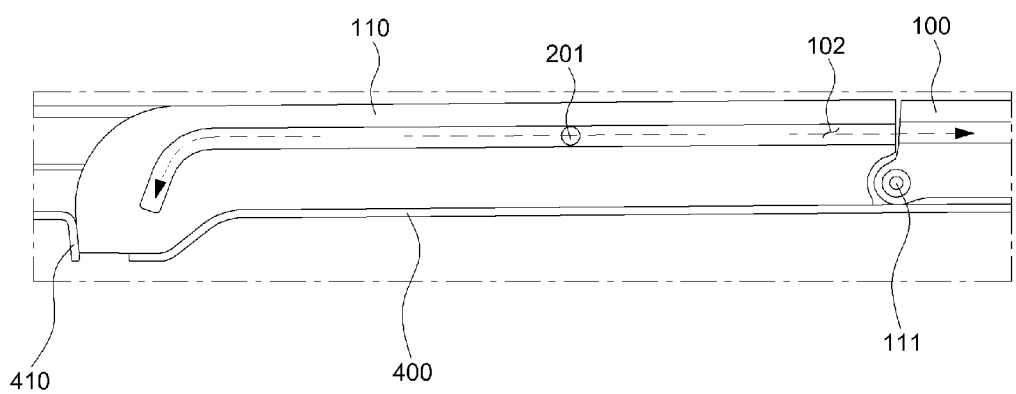
FIG. 4 is a side view of a front sled and a glass sled according to the present invention.

FIG. 1 illustrates an exploded perspective view and an enlarged view illustrating a state in which respective components of a one-motor electric sunshade and sunroof structure according to various embodiments of the present invention are disassembled, FIG. 2 is a perspective view illustrating an appearance of the one-motor electric sunshade and sunroof structure according to various embodiments of the present invention, FIGS. 3A to 3D are enlarged views of parts A, B, C, and D in FIG. 2, and FIG. 4 is a side view of a front sled and a glass sled according to the various embodiments of the present invention.

As illustrated, the one-motor electric sunshade and sunroof structure according to various embodiments of the present invention includes glass sleds 100 which are slidable along mechanism rails 400, main cable devices 200 which are connected with a drive motor 440 by means of a cable, and sunshade sleds 300 which open and close a sunshade.

Specifically, the glass sled 100 is formed in a shape similar to a bar shape elongated in a front and rear direction of a vehicle along the mechanism rail 400, and a glass groove 102 is recessed in a side surface of the glass sled 100 in a longitudinal direction of the glass sled 100.

A front sled 110 is hingedly and rotatably coupled to a front end of the glass sled 100 by means of a first hinge (111 in FIG. 4), and a rear sled 120 is hingedly and rotatably coupled to a rear end of the glass sled 100 by means of a second hinge (121 in FIG. 2).

An end of the front sled 110 (a front end in the illustrated exemplary embodiments) is formed to be bent downward so that the front sled has an overall shape similar to an 'L' shape, and an end of the rear sled 120 (a rear end in the illustrated embodiments) is also formed to be bent downward so that the rear sled has an overall shape similar to an 'L' shape.

An end of the glass groove 102, which is formed in a side surface of the front sled 110, is also formed to be bent downward to correspond to the shape of the front sled, and an end of the glass groove 102, which is formed in a side surface of the rear sled 120, is also formed to be bent downward to correspond to the shape of the rear sled.

In the mechanism rail 400, a front restricting groove 410 is formed to be recessed so as to correspond to a position where the end of the front sled 110 is seated, and a rear restricting groove 420 is formed to be recessed so as to correspond to a position where the end of the rear sled 120 is seated.

The front restricting groove 410 and the rear restricting groove 420 restrict the forward and rearward movement of the glass sled 100, and serve to prevent a sunroof glass 101 from being moved in the front and rear direction when the sunroof glass is closed.

As illustrated in FIG. 2, a tilt lever 104 is mounted at a lateral side of the glass sled 100 in parallel with the glass sled, and the tilt lever 104 serves to tilt up or down the sunroof glass 101 by being rotated in a vertical direction at a lower side of the sunroof glass.

A tilt groove 105 is formed to be recessed in a side surface of the tilt lever 104 in a longitudinal direction of the tilt lever 104, a tilt protrusion portion 103 protrudes from and is coupled to a side surface of the glass sled 100, and the tilt protrusion portion 103 is slidably accommodated in the tilt groove 105.

That is, when the glass sled 100 moves forward, the tilt protrusion portion 103 slides along the tilt groove 105, and the tilt lever 104 is rotated upward by the sliding motion of the tilt protrusion portion 103, thereby tilting up the sunroof glass 101.

As illustrated in FIGS. 3D and 4, a cable protrusion 201, which may be accommodated in the glass groove 102, protrudes on a side surface of the main cable device 200 which is connected with the drive motor 440 by means of the cable and movable along the mechanism rail 400.

The cable protrusion 201 serves to release the glass sled 100 by rotating the front sled 110 or the rear sled 120 while moving along the glass groove 102, and to move the glass sled 100 in the front and rear direction.

That is, the front sled 110 is released from the mechanism rail 400 by being rotated upward by the forward movement of the main cable device 200, and as the cable protrusion 201 moves further forward in a state in which the cable protrusion 201 is in contact with the front end of the glass groove 102, the glass sled 100 is moved forward together with the cable protrusion 201.

As the glass sled 100 moves forward, the tilt protrusion portion 103 also moves forward, and in this case, the tilt lever 104 is rotated upward. When the glass sled 100 moves rearward, the tilt protrusion portion 103 moves the tilt lever 104 rearward while also moving rearward, and in this case, the sunroof glass 101 is opened.

Figure 6A:
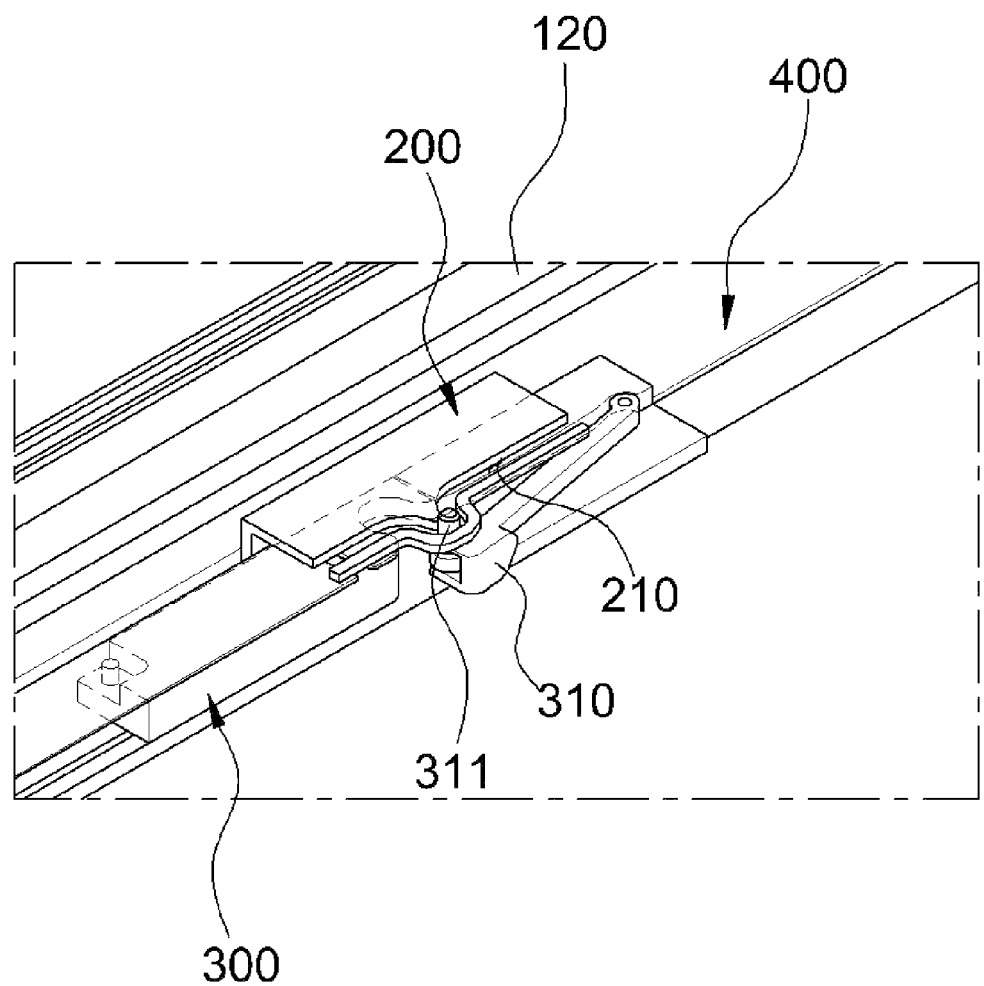
FIG. 6A and FIG. 6B respectively illustrate a perspective view and a top plan view of a state in which the mechanism rail and the sunshade lever according to the present invention are released.
Figure 6B:
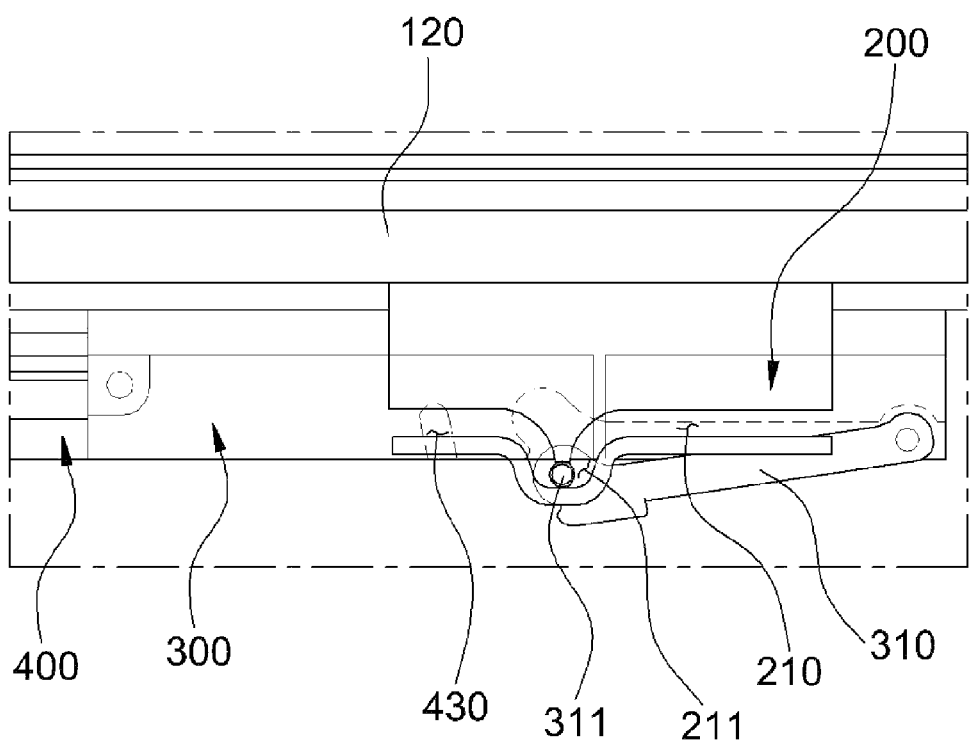

FIGS. 5A and 5B illustrate a perspective view and a top plan view of a state in which the mechanism rail and a sunshade lever according to various embodiments of the present invention are restricted, and FIGS. 6A and 6B illustrate a perspective view and a top plan view of a state in which the mechanism rail and the sunshade lever according to various embodiments of the present invention are released.

As illustrated, a cable groove 210 in which a sunshade protrusion 311, which protrudes at an upper side of the sunshade lever 310, is slidably accommodated is formed to be recessed at a lower side of the main cable device 200, and the sunshade lever 310 is selectively restricted with the mechanism rail 400.

Specifically, the sunshade lever 310 is inserted into a trimmed portion 430 of the mechanism rail 400 at normal times (when the sunshade lever 310 is restricted) and prevents the sunshade sled 300 from being moved in the front and rear direction, thereby preventing a sunshade 301 from being moved in the front and rear direction.

As the main cable device 200 moves in the front and rear direction, the sunshade lever 310 is withdrawn from the trimmed portion 430 of the mechanism rail 400 by being rotated, and as a result, the sunshade sled 300 may also be moved in the front and rear direction.

As illustrated in FIGS. 5A and 5B, a catching portion 211 having a 'U' shape is formed to be recessed in the cable groove 210, and the catching portion 211 serves to allow the main cable device 200 and the sunshade sled 300 to move together simultaneously with the rotation of the sunshade lever.

That is, as the sunshade protrusion 311 slides along the cable groove 210 to the catching portion 211, the sunshade lever 310 is rotated, and in this state, as the main cable device 200 moves in the front and rear direction, the sunshade sled 300 is also moved forward and rearward together with the main cable device 200.

The catching portion 211 is formed at a center of the entire cable groove 210 and the remaining portions except for the catching portion are formed straight so that the cable groove 210 is formed in a shape similar to a 'U' shape, and a width of the cable groove 210 is equal to or relatively and slightly larger than a diameter of the sunshade protrusion 311.

A process of operating the one-motor electric sunshade and sunroof structure according to various embodiments of the present invention will be described below in detail.

Figure 7:
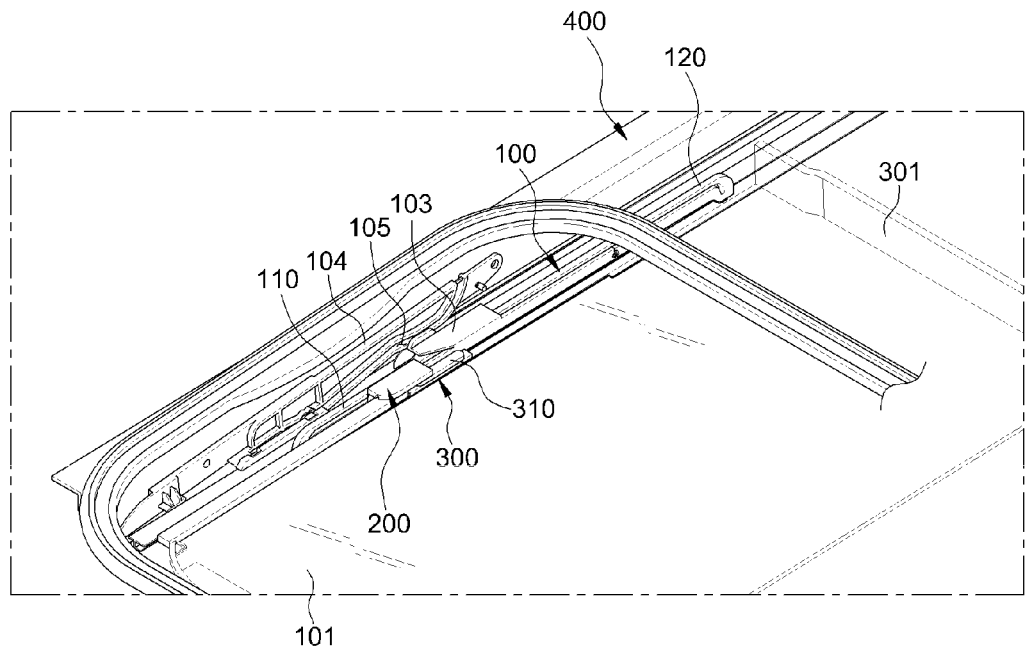
FIG. 7 is an exemplified view illustrating a state in which both a sunshade and a sunroof glass of the one-motor electric sunshade and sunroof structure according to the present invention are closed.

FIG. 7 is an exemplified view illustrating a state in which both of the sunshade and the sunroof glass of the one-motor electric sunshade and sunroof structure according to various embodiments of the present invention are closed.

As illustrated in FIG. 7, when the sunshade 301 and the sunroof glass 101 are closed, both of the front sled 110 and the rear sled 120 are restricted by the mechanism rail 400, and the sunshade lever 310 is also kept restricted by the trimmed portion 430 of the mechanism rail. Therefore, both of the sunroof glass 101 and the sunshade 301 are prevented from being moved in the front and rear direction.

Figure 8:
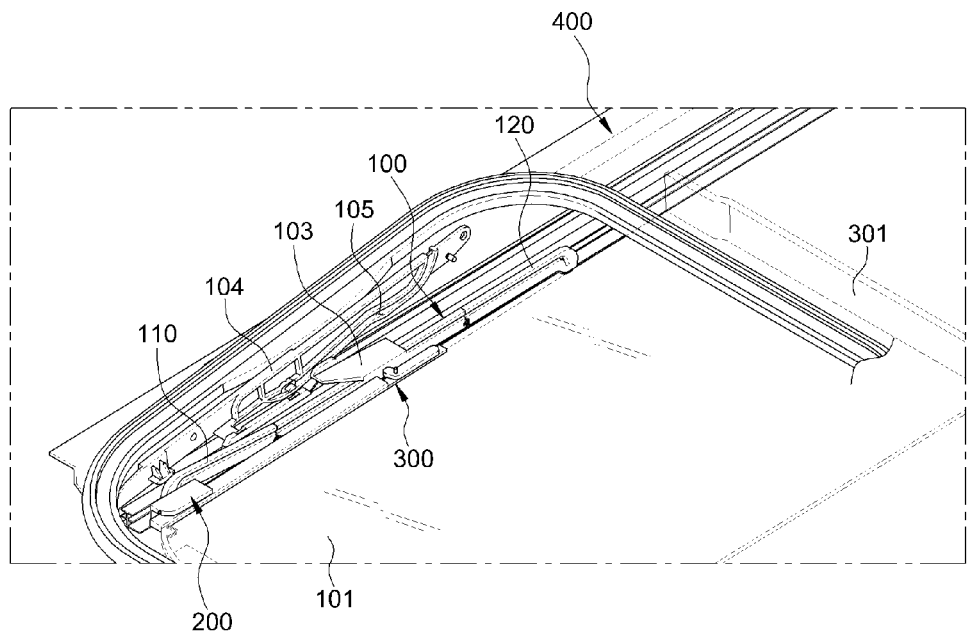
FIG. 8 is an exemplified view illustrating a state in which the sunroof glass of the one-motor electric sunshade and sunroof structure according to the present invention is tilted up.

FIG. 8 is an exemplified view illustrating a state in which the sunroof glass of the one-motor electric sunshade and sunroof structure according to various embodiments of the present invention is tilted up.

As illustrated, as the main cable device 200 moves forward, the front sled 110 and the rear sled 120 are released, and as the tilt protrusion portion 103, which is coupled to a lateral side of the glass sled 100, moves along the tilt groove 105, the tilt lever 104 is rotated upward. Therefore, the sunroof glass 101 is tilted up by being rotated upward.

Figure 9:
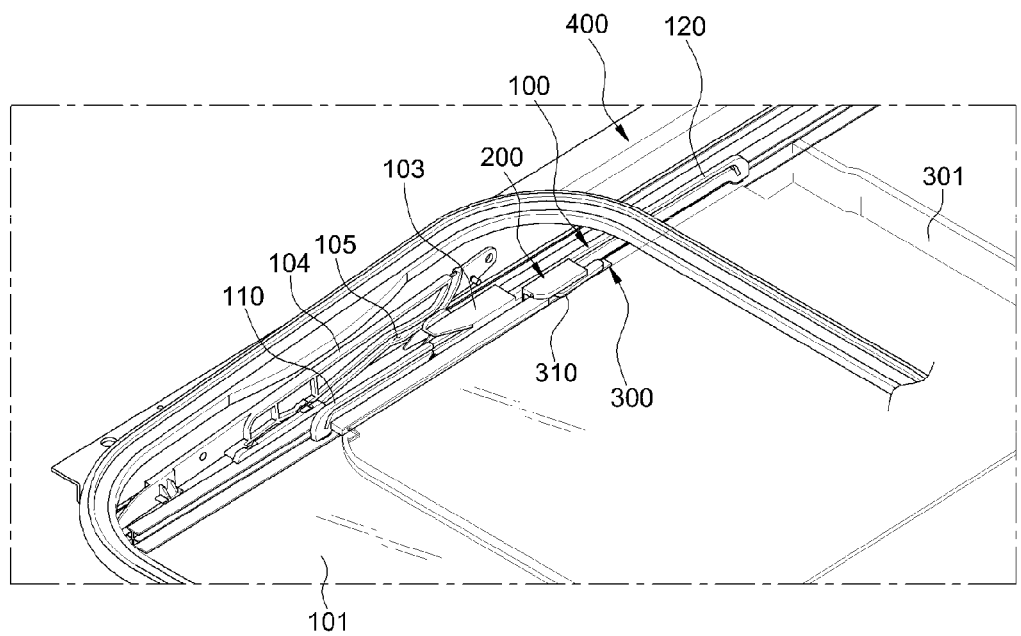
FIG. 9 is an exemplified view illustrating a state in which the sunshade of the one-motor electric sunshade and sunroof structure according to the present invention is opened.

FIG. 9 is an exemplified view illustrating a state in which the sunshade of the one-motor electric sunshade and sunroof structure according to various embodiments of the present invention is opened.

As illustrated in FIG. 9, as the main cable device 200 moves rearward after the sunroof glass 101 is tilted up, the sunshade protrusion 311 of the sunshade lever slides to the catching portion 211 of the cable groove, and as a result, the restriction between the mechanism rail 400 and the sunshade lever 310 is released.

As the main cable device 200 moves further rearward in a state in which the restriction between the mechanism rail 400 and the sunshade lever 310 is released, the main cable device 200 and the sunshade sled 300 are moved rearward together, and as a result, the sunshade 301 of the vehicle is opened.

Figure 10:
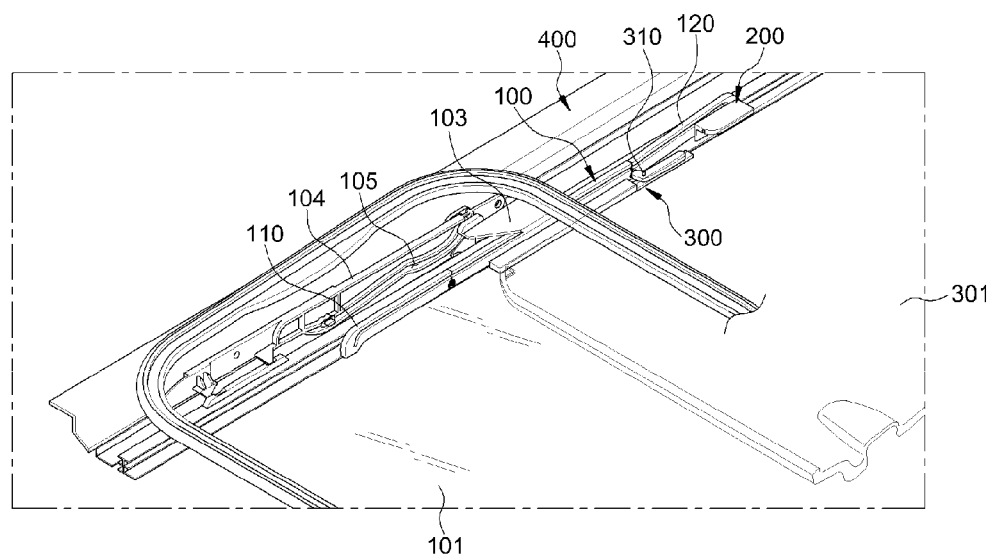
FIG. 10 is an exemplified view illustrating a state in which the sunroof glass of the one-motor electric sunshade and sunroof structure according to the present invention is opened.

FIG. 10 is an exemplified view illustrating a state in which the sunroof glass of the one-motor electric sunshade and sunroof structure according various embodiments of the present invention is opened.

As illustrated in FIG. 10, when the main cable device 200 is fully moved to the rear end of the rear sled 120, the sunshade protrusion 311 is withdrawn from the catching portion 211, the sunshade lever 310 is restricted by the mechanism rail 400 again, and the glass sled 100 moves rearward together with the main cable device 200, so that the tilt protrusion portion 103 is also fully moved to the rear end of the tilt groove 105.

In this state, when the main cable device 200 is still further moved rearward, the tilt lever 104 is also moved rearward together with the glass sled 100, and the sunroof glass 101 is slowly moved rearward and then opened.

An operation of closing the sunroof glass 101 and the sunshade 301 may be implemented by reversely performing the aforementioned operating process, and in this case, a portion, which protrudes to be convex upward to correspond to the operations of opening and closing the sunroof glass, may be formed on the tilt groove 105.

As described above, in the case of the one-motor electric sunshade and sunroof structure according to various embodiments of the present invention, both of the sunroof glass and the sunshade may be operated only by one drive motor, and as a result, production costs for a vehicle and a weight of a vehicle body are remarkably reduced.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A one-motor electric sunshade and sunroof structure comprising:
    glass sleds configured to open and close a sunroof glass by sliding in a front and rear direction along mechanism rails disposed at both sides of a roof panel for a vehicle, each having both ends to which a front sled and a rear sled are rotatably coupled, respectively;
    main cable devices movable along the mechanism rails, each having a cable protrusion that protrudes to be slidably accommodated in glass grooves formed in side surfaces of the front sled, the rear sled, and the glass sled; and
    sunshade sleds selectively coupled to the main cable devices and configured to open or close a sunshade by sliding, each having a first side at which a sunshade lever, which is configured to be selectively restricted with a corresponding mechanism rail, is mounted,
    wherein the sunroof glass and the sunshade for the vehicle are opened and closed by a same drive motor.

2. The one-motor electric sunshade and sunroof structure of claim 1, further comprising:
    a tilt lever is disposed at a lower side of the sunroof glass to be rotatable in a vertical direction, and includes a tilt groove recessed in a side surface of the tilt lever; and
    a tilt protrusion portion protruding from and coupled to a first side of the glass sled, and slidably accommodated in the tilt groove,
    wherein when the glass sled moves forward, the tilt lever moves upward by the sliding motion of the tilt protrusion portion and tilts up the sunroof glass.

3. The one-motor electric sunshade and sunroof structure of claim 1, wherein the front sled is hingedly coupled to a front end of the glass sled by a first hinge, the rear sled is hingedly coupled to a rear end of the glass sled by a second hinge, and an end of each of the front sled and the rear sled is formed with a downward bend.

4. The one-motor electric sunshade and sunroof structure of claim 3, wherein in each mechanism rail, a front restricting groove is formed recessed to correspond to a position where the end of the front sled is seated, and a rear restricting groove is formed recessed to correspond to a position where the end of the rear sled is seated.

5. The one-motor electric sunshade and sunroof structure of claim 1, wherein a cable groove, in which a sunshade protrusion which protrudes at an upper side of the sunshade lever is slidably accommodated, is formed recessed at a lower side of the main cable device, and the sunshade protrusion is configured to release a restriction between the mechanism rail and the sunshade lever by sliding along the cable groove by the movement of the main cable device.

6. The one-motor electric sunshade and sunroof structure of claim 5, wherein a catching portion, which is recessed in a 'U' shape and allows the main cable device and the sunshade sled to move simultaneously with rotation of the sunshade lever, is formed in the cable groove.

7. The one-motor electric sunshade and sunroof structure of claim 6, wherein the catching portion is formed at a central portion of the cable groove, and remaining portions of the cable groove other than the catching portion are formed in a straight shape.

\* \* \* \* \*